United States Patent
Davila et al.

(10) Patent No.: US 9,530,556 B2
(45) Date of Patent: Dec. 27, 2016

(54) MULTIPLE RESONANT CELLS FOR WIRELESS POWER MATS

(71) Applicant: DET International Holding Limited, Grand Cayman (KY)

(72) Inventors: Marco Antonio Davila, Tucson, AZ (US); Ionel Jitaru, Tucson, AZ (US)

(73) Assignee: DET International Holding Limited, Grand Cayman (KY)

( * ) Notice: Subject to any disclaimer, the term of this patent is extended or adjusted under 35 U.S.C. 154(b) by 722 days.

(21) Appl. No.: 13/887,528

(22) Filed: May 6, 2013

(65) Prior Publication Data

US 2013/0307347 A1 Nov. 21, 2013

Related U.S. Application Data

(60) Provisional application No. 61/642,950, filed on May 4, 2012.

(51) Int. Cl.
| | | |
|---|---|---|
| H01F 38/00 | (2006.01) | |
| H01F 38/14 | (2006.01) | |
| H02J 5/00 | (2016.01) | |
| H02J 7/02 | (2016.01) | |
| H02J 17/00 | (2006.01) | |

(52) U.S. Cl.
CPC .............. *H01F 38/14* (2013.01); *H02J 5/005* (2013.01); *H02J 7/025* (2013.01); *H02J 17/00* (2013.01)

(58) Field of Classification Search
USPC ....................................................... 307/104
See application file for complete search history.

(56) References Cited

U.S. PATENT DOCUMENTS

| | | |
|---|---|---|
| 1,876,451 A | 9/1932 | Telefunken |
| 4,301,404 A | 11/1981 | Ley |
| 2004/0119576 A1 | 6/2004 | Nakao |
| 2004/0232845 A1 | 11/2004 | Baarman |
| 2005/0140482 A1 | 6/2005 | Cheng |
| 2007/0145830 A1* | 6/2007 | Lee ................ H02J 5/005 307/135 |
| 2010/0308939 A1 | 12/2010 | Kurs |

FOREIGN PATENT DOCUMENTS

| | | |
|---|---|---|
| DE | 10112892 A2 | 10/2002 |
| EP | 0507360 A2 | 10/1992 |
| EP | 1011187 A1 | 6/2000 |
| EP | 1634366 A1 | 3/2006 |
| EP | 2172952 A1 | 4/2010 |
| EP | 2196351 A1 | 6/2010 |
| GB | 2458476 A | 9/2009 |

(Continued)

OTHER PUBLICATIONS

European Patent Office Search Report, Mar. 23, 2015, 10 pages, Application No. EP 13405056.6.

(Continued)

*Primary Examiner* — Rexford Barnie
*Assistant Examiner* — Dru Parries
(74) *Attorney, Agent, or Firm* — Robert S. Babayi; Vector IP Law Group

(57) ABSTRACT

A method of configuring windings in an inductive charging pad array by using capacitors for impedance control and configuring windings to reduce the stray magnetic fields produced.

17 Claims, 7 Drawing Sheets

(56) References Cited

FOREIGN PATENT DOCUMENTS

| | | |
|---|---|---|
| JP | 2001076598 A | 3/2001 |
| JP | 2009123727 A | 6/2009 |
| JP | 2011142177 A | 7/2011 |
| WO | 9948130 A1 | 9/1999 |
| WO | 0116995 A1 | 3/2001 |
| WO | 2008140333 A2 | 11/2008 |
| WO | 2009111597 A2 | 9/2009 |
| WO | 2010/090538 A1 | 8/2010 |
| WO | 2010090538 A1 | 8/2010 |
| WO | 2010090539 A1 | 8/2010 |
| WO | 2011148289 A2 | 12/2011 |
| WO | 2012008693 A2 | 1/2012 |
| WO | 2012/018268 A1 | 2/2012 |
| WO | 2012018268 A1 | 2/2012 |

OTHER PUBLICATIONS

European Patent Office Search Report, Jun. 23, 2014, 8 pages, Application No. EP 13405055.8.

European Patent Office Search Report, Feb. 11, 2015, Application No. EP 13405054.1.

European Patent Office Search Report, Jan. 13, 2014, Application No. EP 13405057.4.

Fotopoulou K et al., "Wireless Powering of Implanted Sensors using RF Inductive Coupling",Sensors, 2006. 5th IEEE Conference on, IEEE, PI, Oct. 22, 2006 (Oct. 22, 2006), pp. 765-768.

Phadke A G et al., "A New Measurement Technique for Tracking Voltage Phasors, Local System Frequency, and Rate of Change of Frequency", IEEE Transactions on Power Apparatus and Systems, IEEE Inc. New York, US, vol. PAS-100, No. 5, May 1, 1983 (May 1, 1983), pp. 1025-1103.

Budhia M et al: "A new IPT magnetic coupler for electric vehicle charging systems", IECON 2010—36th Annual Conference on IEEE Industrial Electronics Society, IEEE, Nov. 7, 2010 (Nov. 7, 2010), pp. 2487-2492, NJ, USA.

Masato Chigira et al: "Small-size light-weight transformer with new core structure for contactless electric vehicle power transfer system", Energy Conversion Congress and Exposition (ECCE), 2011 IEEE, IEEE, Sep. 17, 2011, pp. 260-266.

European Patent Office Communication Pursuant to Article 94(3) EPC, Jul. 9, 2015, Application No. 13 405 058.2.

* cited by examiner

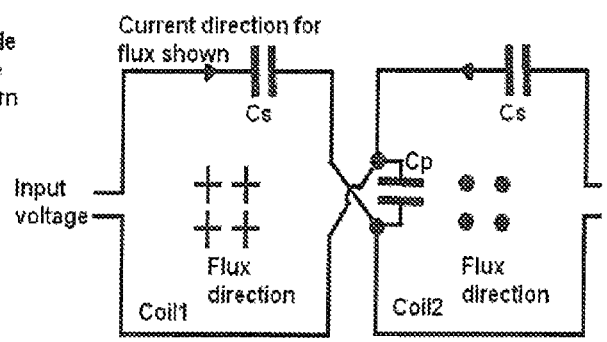
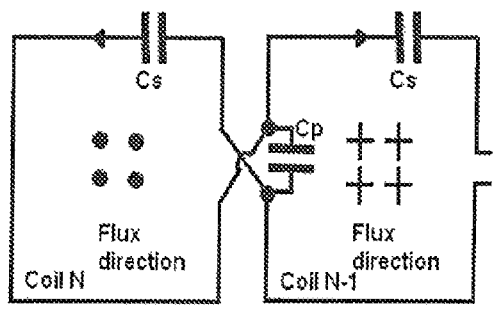
Figure 7
A possible inductive pad patern
Alternating flux direction reduces stray magnetic fields at far distances.
The is illustrated for 2 rows, but more can be done.
Cs are series resonant capacitors. Cp are parallel resonant capacitors. Cs capacitors may be changed to shorts and Cp capacitors to opens.

MULTIPLE RESONANT CELLS FOR WIRELESS POWER MATS

RELATED APPLICATION/CLAIM OF PRIORITY

This application is related to and claims priority from U.S. Provisional application Ser. No. 61/642,950, entitled Multiple Resonant Cells for Inductive Charging Pads, filed May 4, 2012, which provisional application is incorporated herein by reference.

INTRODUCTION

Inductive charging pads have grown in popularity but are still not gaining in popularity as fast as the wireless power industry would like. One of the selling points of wireless technology is that it relieves the consumer of the "transmitter" portion of a power supply in that the transmitter can be on a table in an airport lounge. This potentially would reduce the amount of weight that a consumer would carry to power his/her personal electronics. The main problem with wireless power is that it relies on the magnetic field, a very tightly coupled field that reduces drastically compared with other fields with distance. The reason that the magnetic field works at low distances is that it always appears as a dipole. The magnetic field must return back as a loop and it always favors the shortest path.

What is desired in an inductive charging pad is a way that the magnetic field can be moved to where the power device is sitting to be able to adequately charge the device. There have been several techniques recently purposed. Some techniques are complex or expensive and others flood the room with magnetic fields to able to compensate for the magnetic field near distance short comings.

The ideal inductive charging pad would be one that in any place a receiver is placed; it would deliver efficient power to the receiver while being relatively inexpensive. Another desired trait would be that the mat would be able to charge multiple devices each with its own power level. The last requirement is very difficult to achieve. The present invention addresses the first requirement and may address the second.

PRIOR ART

The first technique of moving the magnetic field to where it is needed has been done by placing multiple coils in zones in the mat. Then each coil is individually controlled, by a different set of switches. The idea is that there are multiple primary sections with each set of switches controlling a different coil. This can become expensive due to the amount of multiple switches needed. In addition each coil has to be polled, to detect where the receiver is at. U.S. Pat. No. 7,164,255 by Hui Shu-Yuen illustrates this idea.

Another technique came from the research of MIT, which is similar to the work of Tesla. In this idea, a small transmitter coil is used somewhere in the mat while a resonant coil that goes around the mat resonates at the frequency of transmission. This resonant coil rings with the transmitter at predefined frequency increasing in power with each successive ring. This resonant coil is used to flood the whole mat with magnetic field. When a receiver is placed anywhere in the mat, the receiver acts as a damping device in the system. The transmitter adds power to the ringing system while the receiver takes power away. The amount of power ringing in the system is much larger than the power inject by the transmitter or received by the receiver. This method has the draw back of flooding the room with more power that would otherwise be needed, it is more susceptible to increased power loss into any conductive or magnetic objects in the room, including the housing of the receiver itself. Therefore, this method has proven to be less efficient and has a larger magnetic field that could impact health and violate electro-magnetic compliance regulations.

The accompanying drawings are described below in the context of this invention.

THE PRESENT INVENTION

This present invention provides a different way of targeting the magnetic field where it is needed and in the process reduces stray magnetic fields and increases efficiency. It also further reduces and not increases the stray magnetic field by using the magnetic field properties to its advantage.

BRIEF DESCRIPTION OF THE DRAWINGS

FIG. 7 shows an inductive charging pad with parallel or series resonant capacitors where there is alternating magnetic polarization between the cells.

DISTRIBUTED SERIES RESONANCES.

Figure 1:
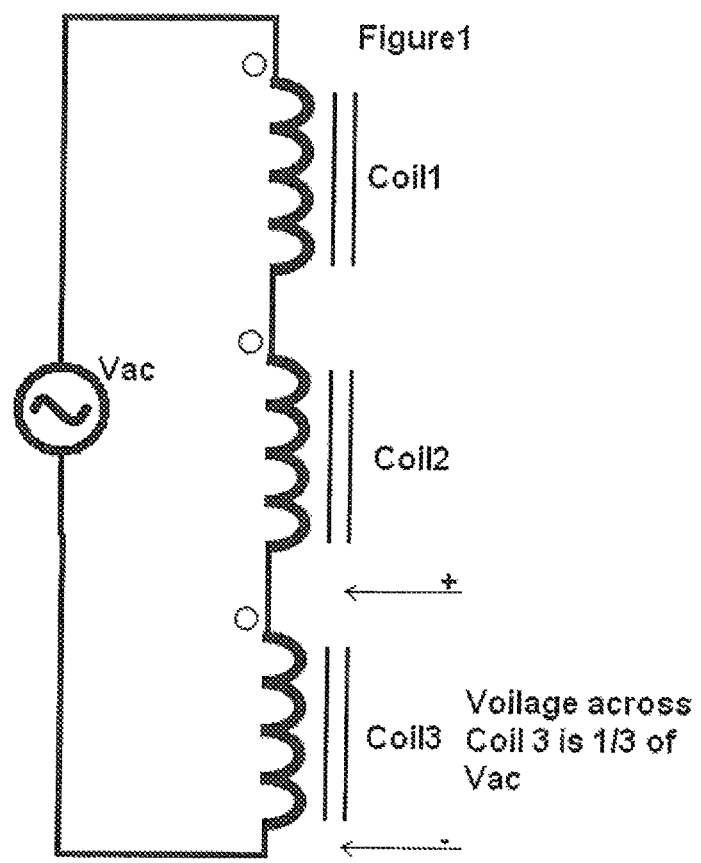
FIG. 1 shows multiple windings in an inductive charging pad configured in series.
Figure 2:
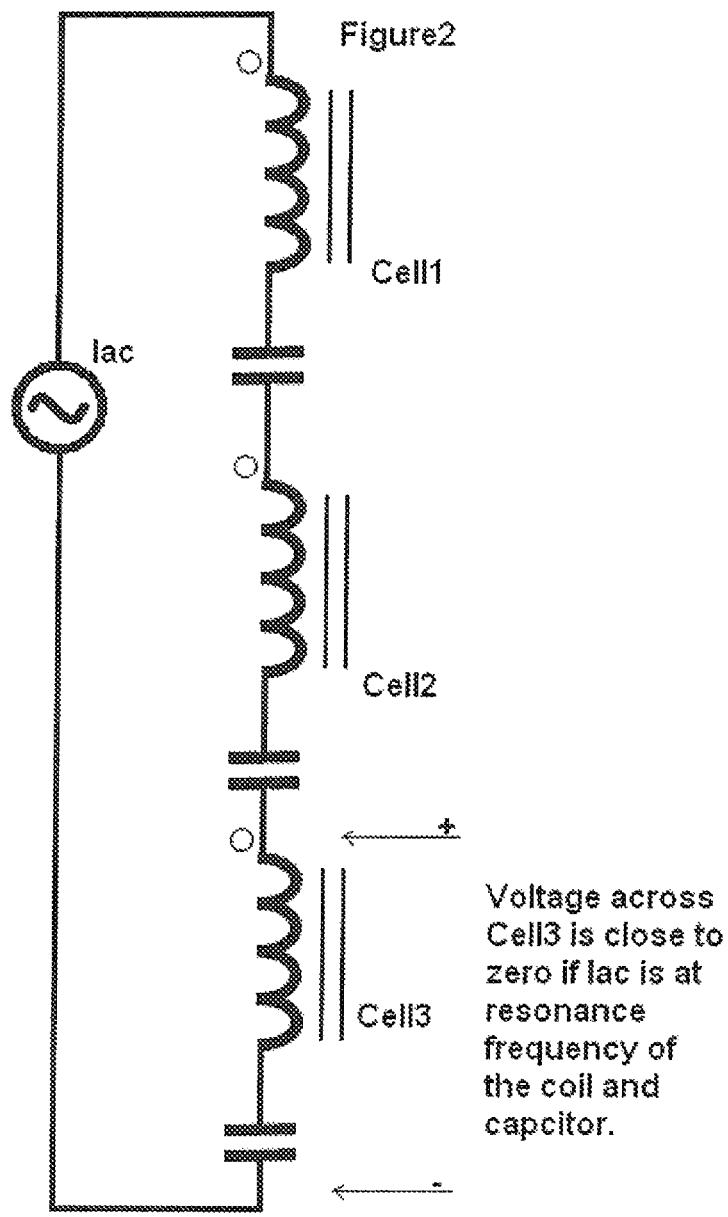
FIG. 2 shows added capacitors in series with each winding.
Figure 3:
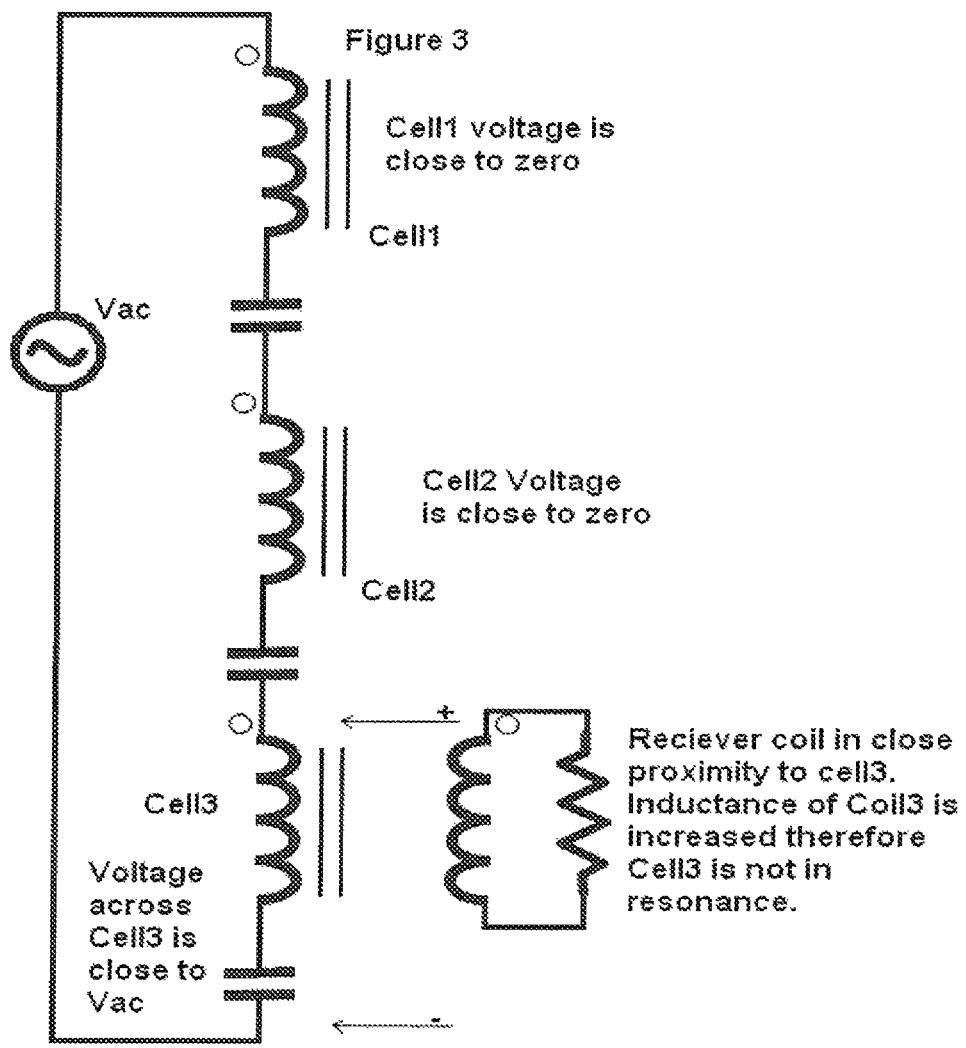
FIG. 3 shows how inductance increases due to increase in mutual inductance between one of the windings and receiver when the one winding is in close proximity to the receiver.

All wireless inductive charging pads are based on a converter that pushes a square wave into a primary winding. For the purpose of this disclosure the incoming waveform can be idealized as a current limited AC sine wave. Let's suppose we had multiple windings in an inductive charging pad (three of them in this illustration, FIG. 1) configured in series. If we applied an AC voltage between point 1 and the common, all of the windings would have an equal share of the voltage thus reducing the voltage at each winding by the number of windings in series. But if we added capacitors in series with each winding as shown in FIG. 2 and tuned the capacitors to be the same reactive impedance as the inductors then each set of winding plus capacitors would be very close to a short. If one of the windings was in close proximity to a receiver its inductance would change and no longer be in resonance with its capacitor. In this case the inductance would increase due to the increase in mutual inductance between this winding and the receiver (FIG. 3). This "detunes" this winding and most of the applied voltage would appear across this winding.

This effect would give what we desired. A voltage is applied where we need and as a consequence the magnetic field is increased in this section of the mat. If the receiver is moved to another location then another of the inductances would change and the original would return to being at a low impedance.

This selection is accomplished passively by resonance of the capacitors to the leakage inductance of the circuit. The capacitors act as a passive switch that bypasses the current if no receiver is nearby.

Distributed Parallel Resonances.

Figure 4:
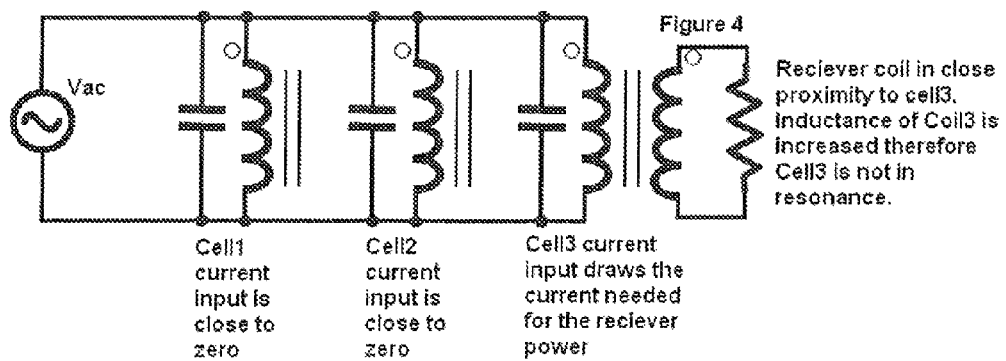
FIG. 4 shows a mat configured with 3 cells with parallel inductance.

Another configuration that can be applied using the same idea is the parallel resonance. FIG. 4 shows a mat configured with 3 cells with parallel resonance. In this case the impedance of the capacitance and the inductance are the same and together will produce an equivalent impedance of an open. The full voltage is applied to all cell elements but each element will not draw current due to the resonance of the each element. When a receiver is put in close proximity to one of the cells, the inductance of that cell increases and that element will start to draw current. This current is able to power the receiver. Each of the cells that is in resonance draws very little current from the source and virtually all reactive current needed by the inductor is provided by the cell capacitance.

Reversed Resonances.

It is also possible to reverse the resonances by putting the parallel resonance cells in series or by putting the series resonance cells in parallel.

Figure 5:
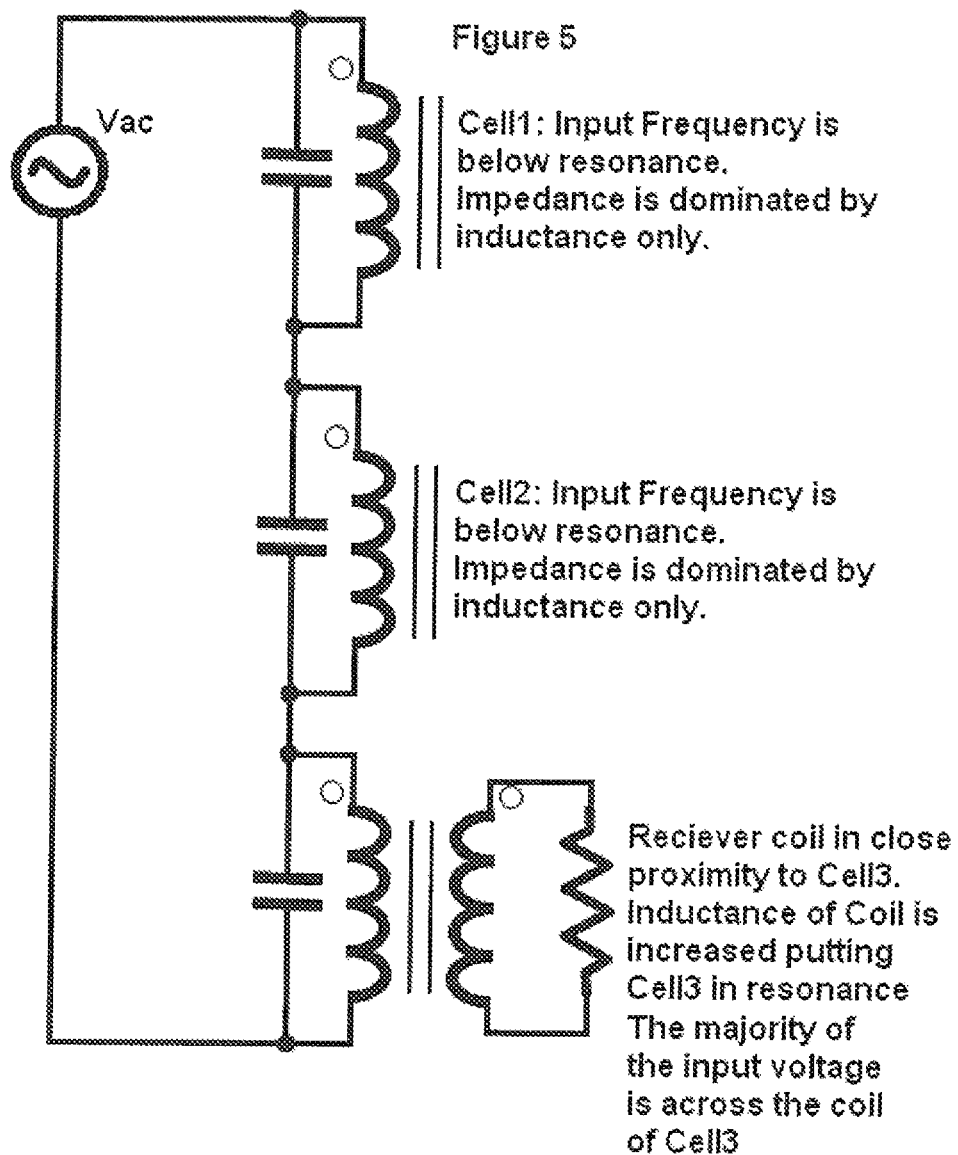
FIG. 5 shows reversing resonances with parallel resonance cells in series.

This concept is illustrated in FIG. 5 for series paralleled cells. In this concept the frequency of operation is below the resonance point. When one of the cells is in close proximity to a secondary receiver its inductance increase which puts it in resonance with the operating frequency. Its impedance increase and the majority of the input voltage is applied across it. This effect is not as strong as the previous discussed effect since the cells operating in series with the resonant cell still have some impedance that will reduce the available voltage on this cell.

Figure 6:
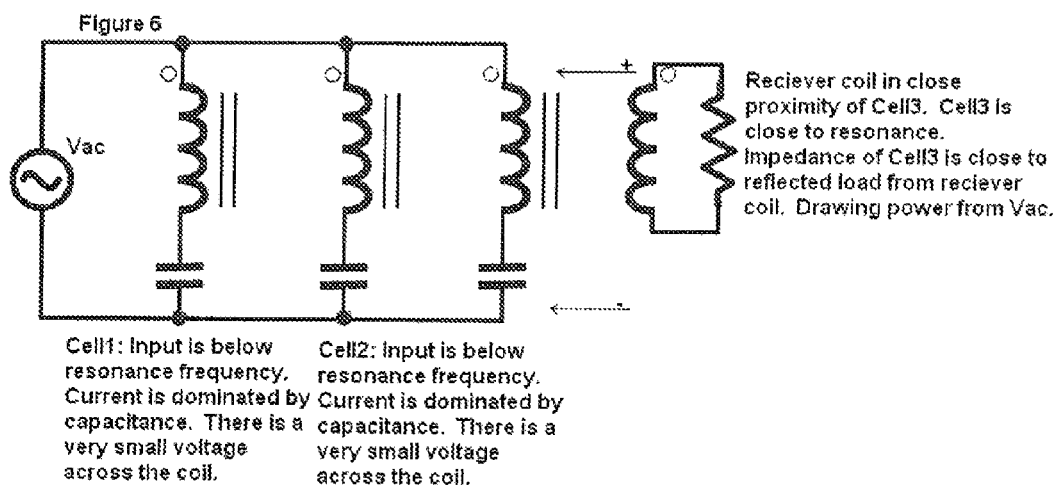
FIG. 6 shows resonance cells in parallel.

The converse is illustrated in FIG. 6. In this case all the series resonant cells are put in parallel. In this concept the source is again at a lower frequency than resonance. Each of the capacitors in the cells thus is a large impedance at this frequency in comparison with their inductances. Therefore, the individual inductances receive very little voltage. When a secondary is placed close to one of the cells its inductance will increase and produce a larger voltage on the primary of the transformer. In this case the cell becomes lower impedance and starts to draw more current. This extra current is applied to the load reflected from the secondary. This concept has the added benefit of reducing the magnetic field applied to regions that no secondary (receiver) exists.

Alternating Cells

In the previous concepts the actual construction of the mat has not been detailed. It is possible to layout all the windings in the same magnetic polarization. But it is beneficial to alternate the magnetic polarization between cells. This creates a coupling from cell to cell which must be compensated (will increase the starting inductance). But it produces a benefit that the magnetic field will diminish sooner with distance from the mat. This is due to creating multiple dipoles in opposite directions such that a larger distance the dipoles cancel the magnetic field. This seems counter intuitive since extending the magnetic field was the original intent. Since the magnetic field on the mat is very localized this is not needed and this added benefit will contain the magnetic field in a smaller space thus increasing efficiency overall. FIG. 7 illustrates the construction of the inductive charging pad with this concept including the parallel or series resonant capacitors.

The invention claimed is:

1. Method of targeting the magnetic field of an inductive charging pad to a nearby receiver, by providing multiple windings and an AC input (Vac) having a frequency of operation, characterized by constructing a resonant cell (Cell1, Cell2, Cell3) by adding a capacitor to each of said windings, wherein the magnetic field of a particular resonant cell (Cell1, Cell2, Cell3) is passively increased by moving a resonance point of said resonant cell when bringing a secondary winding of a receiver in proximity to said resonant cell (Cell1, Cell2, Cell3), including the step of arranging the capacitor and the winding of each resonant cell (Cell1, Cell2, Cell3) in series.

2. Method according to claim 1, including the step of arranging the resonant cells (Cell1, Cell2, Cell3) in parallel, wherein an inductance of a resonant cell (Cell1, Cell2, Cell3) is drawing more current when bringing the secondary winding of the receiver in proximity to said resonant cell (Cell1, Cell2, Cell3).

3. Method according to claim 1 including the step of cancelling the magnetic field far away from the inductive charging pad by alternating the polarity between two neighbouring resonant cells (Cell1, Cell2, Cell3).

4. Method according to claim 1, including the step of selecting the capacitor and the winding of a resonant cell (Cell1, Cell2, Cell3) to have approximately a same reactance when the secondary winding of the receiver is brought in proximity to said resonant cell.

5. Method according to claim 1, including the step of selecting the capacitor and the winding of a resonant cell (Cell1, Cell2, Cell3) to have approximately a same reactance when the secondary winding of the receiver is not brought in proximity to said resonant cell.

6. Method of targeting the magnetic field of an inductive charging pad to a nearby receiver, by providing multiple windings and an AC input (Vac) having a frequency of operation, characterized by constructing a resonant cell (Cell1, Cell2, Cell3) by adding a capacitor to each of said windings, wherein the magnetic field of a particular resonant cell (Cell1, Cell2, Cell3) is passively increased by moving a resonance point of said resonant cell when bringing a secondary winding of a receiver in proximity to said resonant cell (Cell1, Cell2, Cell3), including the step of arranging the resonant cells (Cell1, Cell2, Cell3) in series, wherein a voltage across a resonant cell (Cell1, Cell2, Cell3) is increased when bringing the secondary winding of the receiver in proximity to said resonant cell (Cell1, Cell2, Cell3).

7. Method according to claim 6, including the step of arranging the capacitor and the winding of each resonant cell (Cell1, Cell2, Cell3) in parallel.

8. Method according to claim 6 including the step of cancelling the magnetic field far away from the inductive charging pad by alternating the polarity between two neighbouring resonant cells (Cell1, Cell2, Cell3).

9. Method according to claim 6, including the step of selecting the capacitor and the winding of a resonant cell (Cell1, Cell2, Cell3) to have approximately a same reactance when the secondary winding of the receiver is brought in proximity to said resonant cell.

10. Inductive charging pad for targeting a magnetic field of the charging pad to a receiver, said inductive charging pad comprising multiple resonant cells (Cell1, Cell2, Cell3) and an AC input for connecting an AC voltage (Vac) having a frequency of operation, each resonant cell (Cell1, Cell2, Cell3) including a winding and a capacitor being connected either in parallel or in series, whereby the multiple resonant cells (Cell1, Cell2, Cell3) are arranged in series across the AC input and wherein a particular cell is adapted to passively increase its magnetic field by moving its resonance point when a secondary winding of the receiver is brought in proximity of said specific resonant cell (Cell1, Cell2, Cell3).

11. Inductive charging pad according to claim 10, wherein a reactive impedance of the winding and a reactive impedance of the capacitor of a resonant cell (Cell1, Cell2, Cell3) at the frequency of operation are approximately the same when the secondary winding of the receiver is in proximity to said resonant cell (Cell1, Cell2, Cell3).

12. Inductive charging pad according to claim 10, wherein a reactive impedance of the winding and a reactive impedance of the capacitor of a resonant cell (Cell1, Cell2, Cell3) at the frequency of operation are approximately the same when the secondary winding of the receiver is not in proximity to said resonant cell (Cell1, Cell2, Cell3).

13. Inductive charging pad according to claim 10, wherein the multiple resonant cells (Cell1, Cell2, Cell3) are arranged in series for increasing a voltage across a particular resonant cell (Cell1, Cell2, Cell3) when the secondary winding of the receiver is brought in proximity to said resonant cell (Cell1, Cell2, Cell3).

14. Inductive charging pad according to claim 10, wherein the multiple resonant cells (Cell1, Cell2, Cell3) are arranged in parallel, so that a particular resonant cell (Cell1, Cell2, Cell3) is adapted to draw more current when the secondary winding of the receiver is brought in proximity to said resonant cell (Cell1, Cell2, Cell3).

15. Inductive charging pad according to claim 10, wherein the windings are arranged such that the polarity between two neighbouring resonant cells (Cell1, Cell2, Cell3) is alternated, for the purpose of cancelling the magnetic field far away from the inductive charging pad.

16. Inductive charging pad according to claim 10, wherein the AC input voltage (Vac) can be idealized by a current limited AC sine wave.

17. Inductive charging arrangement, comprising an inductive charging pad according to claim 10, and a receiver to be targeted by a magnetic field of the inductive charging pad when a secondary winding of the receiver is nearby to the inductive charging pad.

* * * * *